UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 533,508, dated February 5, 1895.

Application filed August 18, 1894. Serial No. 520,716. (Specimens.) Patented in England June 6, 1891, No. 9,636.

*To all whom it may concern:*

Be it known that we, MORITZ ULRICH and JOHANN BAMMANN, chemists, doctors of philosophy, residing at Elberfeld, Prussia, Germany, (assignors to the FARBENFABRIKEN, VORMALS FR. BAYER & CO., of Elberfeld, Germany,) have invented a new and useful Improvement in the Manufacture of Blue Dye, (for which we have obtained Letters Patent in Great Britain, No. 9,636, dated June 6, 1891;) and we do hereby declare the following to be an exact and clear description of our invention.

Our invention relates to the production of blue substantive dye-stuffs resulting from one molecular proportion of tetrazotized para diamin as for example benzidin toluidin, dianisidin and so on, one molecular proportion of amidonaphtholdisulfo acid ($NH_2:SO_3H:SO_3H:OH=1:3:6:8$) and one molecular proportion of amidonaphtholmonosulfo acid ($NH_2:SO_3H:OH=1:4:8$), which dye-stuffs, when fixed on unmordanted fiber, can be diazotized and coupled with so-called developers as for example beta naphthol giving shades from brownish-black to deep black.

In carrying out our invention practically we can proceed as follows: 1.84 kilos, by weight, of benzidin are converted in the well known manner into the tetrazocompound by means of 1.4 kilos, by weight, of sodium nitrite and four liters of hydrochloric acid (21° Baumé) adding one hundred and forty liters of water. This tetrazo-solution is then allowed to run, while stirring, into a solution in water containing such a quantity of the sodium salt of amidonaphtholdisulfo-acid ($NH_2:SO_3H:SO_3H:OH=1:3:6:8$), as corresponds to 0.7 kilo, by weight, of sodium nitrite, with the addition of 2.4 kilos, by weight, of sodium carbonate ($Na_2CO_3$). The formation of the so-called intermediate product is complete in a few minutes. It separates in form of a darkish-blue precipitate. A solution prepared by dissolving such a quantity of the sodium salt of amidonaphtholmonosulfo acid ($NH_2:SO_3H:OH=1:4:8$) as likewise corresponds to 0,7 kilo, by weight of sodium nitrite, is then stirred into the above mixture containing the intermediate product. The resulting reaction mixture is allowed to stand during about twenty-four to thirty hours at ordinary temperature. After this time the combination is complete and the mixture is advantageously heated at about 60° centigrade. The dye-stuff thus formed is salted out, filtered off pressed and dried.

The dye-stuff, which has the following constitution:

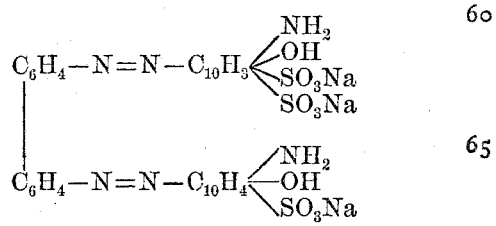

forms, when pulverized, a dark powder with metallic luster, easily soluble in water with a blue color, almost insoluble in cold and hot alcohol. By concentrated sulfuric acid (66° Baumé) it is dissolved with a bluish-green color which turns, on the addition of ice-water to this sulfuric acid solution first into violet-blue, dark flakes being immediately precipitated. On the addition of ammonia liquid to the solution of the dye-stuff in water the color assumes a more greenish-blue hue and on mixing a large quantity of a concentrated solution of sodium carbonate with the solution of the dye-stuff in water the latter is separated as a darkish-blue precipitate. From the solution of the dye-stuff in cold water the free sulfo acid of the color separates in dark flakes when mineral acids as for example dilute hydrochloric or sulfuric acid are added to the above solution in water.

The dye-stuff produces on unmordanted cotton clear blue shades fast to the action of alkali and acid.

When fixed on the fiber the dye-stuff can be further diazotized and combined with the so-called "developers" as for example beta naphthol, brilliant black shades being thus obtained.

Analogous dye-stuffs are obtained, if in the above example the employed benzidin is replaced by the homologous para diamins such as toluidin or dianisidin. The colors thus produced dye unmordanted cotton in shades somewhat more bluish than those derived from benzidin. The process for the production of such dies may be varied in a very different manner. The combination can be carried out in alkaline or in acetic acid solution and the two amidonaphthol sulfo acids can be used in any order with the one exception that the amidonaphtholmonosulfo acid ($NH_2:SO_3H:OH=1:4:8$) when employed in the first place must be coupled in acetic acid solution.

Having now described our invention and in what manner the same is to be performed, what we claim as new, and desire to secure by Letters Patent, is—

1. The process for the production of blue substantive dye-stuffs which consists in combining one molecular proportion of tetrazotized diamins as for example benzidin, toluidin, dianisidin with one molecular proportion of amidonaphtholdisulfo acid ($NH_2:SO_3H:SO_3H:OH=1:3:6:8$) and one molecular proportion of amidonaphtholmonosulfo acid ($NH_2:SO_3H:OH=1:4:8$) in the manner hereinbefore described.

2. As a new article of manufacture the dyes resulting from one molecular proportion of tetrazotized diamin as for example benzidin, toluidin, dianisidin, with one molecular proportion of amidonaphtholdisulfo acid ($NH_2:SO_3H:SO_3H:OH=1:3:6:8$) and one molecular proportion of amidonaphtholmonosulfo acid ($NH_2:SO_3H:OH=1:4:8$), having the general formula:

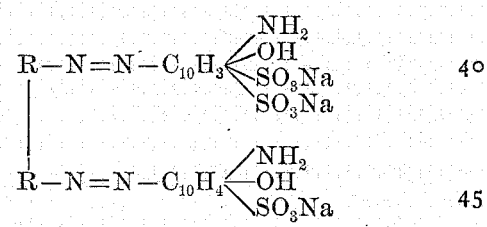

forming a dark powder with metallic luster, easily soluble in water with a blue color, almost insoluble in alcohol, soluble in ammonia liquid and hot concentrated solution of sodium carbonate in water with a blue color, soluble in concentrated sulfuric acid (66° Baumé) with a bluish-green color, which turns on the addition of ice-water first into violet-blue and then blue flakes being precipitated, producing on unmordanted cotton clear blue shades fast to the action of alkali and acid being diazotizable, when fixed on the fiber, and giving when combined with so-called developers especially with beta naphthol very deep black shades of brilliant beauty.

In testimony whereof we have signed our names in the presence of two subscribing witnesses.

MORITZ ULRICH.
JOHANN BAMMANN.

Witnesses:
R. E. JAHN,
T. H. STRAUSS.

It is hereby certified that in Letters Patent No. 533,508, granted February 5, 1895, upon the application of Moritz Ulrich and Johann Bammann, of Elberfield, Germany, for an improvement in "Blue Dyes," errors appear in the printed specification requiring correction as follows: In line 17, page 1, after the word "benzidin" a comma should be inserted, and the following word "toluidin" should read *tolidin;* page 2, lines 2, 22, and 32, the word "toluidin" should read *tolidin;* and in line 6, same page, the word "dies" should read *dyes;* and that the said Letters Patent should be read with these corrections therein that the same may conform to the record of the case in the Patent Office.

Signed, countersigned, and sealed this 19th day of February, A. D. 1895.

[SEAL.]

JNO. M. REYNOLDS,
*Assistant Secretary of the Interior.*

Countersigned:
JOHN S. SEYMOUR,
*Commissioner of Patents.*